(12) United States Patent
     Porter (10) Patent No.: US 9,296,154 B1
(45) Date of Patent: Mar. 29, 2016

(54) TAPERED WATTAGE RADIAL HEATER

(75) Inventor: David W. Porter, Tulsa, OK (US)

(73) Assignee: McElroy Manufacturing, Inc., Tulsa, OK (US)

(*) Notice: Subject to any disclaimer, the term of this patent is extended or adjusted under 35 U.S.C. 154(b) by 2235 days.

(21) Appl. No.: 12/221,838

(22) Filed: Aug. 7, 2008

(51) Int. Cl.
    *H05B 3/10*     (2006.01)
    *B29C 65/78*     (2006.01)

(52) U.S. Cl.
    CPC .................. *B29C 65/7841* (2013.01)

(58) Field of Classification Search
    CPC ............ B29C 65/7841; B29C 66/1122; B29C 66/112; B29C 66/1142; B29C 66/1222; B29C 66/1224; B29C 66/91421; B29C 65/3468; B29C 65/348; B29C 65/3496; B29C 65/7858; B29C 65/7897
    USPC .......... 219/552, 243, 535, 538; 285/286, 423; 264/230; 156/158, 433, 503, 579
    See application file for complete search history.

(56) References Cited

U.S. PATENT DOCUMENTS

| | | | | |
|---|---|---|---|---|
| 3,189,992 A * | 6/1965 | Wilson, Jr. | ..................... | 228/147 |
| 3,723,705 A * | 3/1973 | Province | ........................ | 219/243 |
| 4,253,012 A * | 2/1981 | Hughes | ....................... | 219/458.1 |
| 4,322,606 A * | 3/1982 | Bayly | ............................ | 219/550 |
| 4,447,711 A * | 5/1984 | Fischer | ..................... | 219/448.11 |
| 4,455,482 A * | 6/1984 | Grandclement | .............. | 219/551 |
| 4,792,374 A * | 12/1988 | Rianda | .......................... | 156/503 |
| 5,163,713 A * | 11/1992 | Brettell et al. | ............... | 285/21.2 |
| 5,204,510 A * | 4/1993 | McWilliams et al. | ..... | 219/461.1 |
| 5,462,206 A * | 10/1995 | Kwasie | ....................... | 222/146.5 |
| 5,543,603 A * | 8/1996 | Schmadig et al. | ............ | 219/550 |
| 5,802,856 A * | 9/1998 | Schaper et al. | ................... | 62/3.7 |
| 5,864,941 A * | 2/1999 | Baichoo et al. | ................. | 29/611 |
| 5,990,462 A * | 11/1999 | Scholl | ............................ | 219/535 |
| 6,018,616 A * | 1/2000 | Schaper | ........................ | 392/418 |
| 7,202,450 B2 * | 4/2007 | Barber et al. | ................. | 219/616 |
| 2002/0100540 A1* | 8/2002 | Savitski et al. | .............. | 156/157 |
| 2004/0084434 A1* | 5/2004 | Desloge | ........................ | 219/221 |
| 2004/0206741 A1* | 10/2004 | Nakagawa | .................... | 219/243 |
| 2005/0199615 A1* | 9/2005 | Barber et al. | ................. | 219/672 |
| 2007/0023419 A1* | 2/2007 | Ptasienski et al. | ............ | 219/543 |

* cited by examiner

*Primary Examiner* — Eric Stapleton
(74) *Attorney, Agent, or Firm* — Frank J. Catalano; Gable Gotwals (57) ABSTRACT

A heater plate for butt fusion of polyolefin pipe has concentric rings, each with an array of radial bores containing cartridge heaters, and a concentric cavity between the rings to carry wiring from the cartridge heaters. The inner ring components are symmetrical to provide a foundation for uniform surface temperature distribution across the entire area of the inner ring. The outer ring components are coordinated to counterbalance the heat sinks resulting from their asymmetrical configuration so as to increase the likelihood that the uniform surface temperature distribution foundation established for the entire area of the inner ring can be maintained and so that the total diameter of the heater plate, including the outer ring, can be used in fusing pipe.

15 Claims, 7 Drawing Sheets

TAPERED WATTAGE RADIAL HEATER

BACKGROUND OF THE INVENTION

This invention relates generally to pipeline construction and more particularly concerns equipment used in joining sections of pipe end-to-end.

Known conventional designs of fusion machine heaters include mica/foil heaters, cast tubular heaters and machined plates with bent tubular heaters, all of which are very expensive. Mica/foil heaters are very difficult to design and are useful only on relatively small heaters. Cast tubular heaters do not permit zoned heat distribution and cannot be repaired. Bent tubular heaters do not permit zoned heat distribution and tend to break at the bends due to thermal expansion differentials.

A fusion heater was also proposed 35 years ago which would use a plate with a central opening and metal-cased heaters snugly held in radial bores extending on the central plane of the plate from its outer to its inner circumferences. The bores would be equally radially displaced in an effort to provide a sufficiently uniform distribution of heat to achieve good fusion for a range of pipe diameters. The outer ends of the bores would be plugged to hold the heaters in place and the heaters, peripherals and controls would be connected in the central opening in order to hold the diameter of the heater to a minimum. In such a configuration the heater spacing for larger diameter pipes of this range becomes so great that uniform temperature distribution is not possible. Therefore, the heater is good for only a small range of pipe diameters.

It is, therefore, an object of this invention to provide a heater plate which accommodates differential expansion of the heaters and the heater body. Another object of this invention is to provide a heater plate which facilitates uniform temperature distribution over a wide area. It is also an object of this invention to provide a heater plate which can be repaired in the field. A further object of this invention is to provide a heater plate which will accommodate a wide range of pipe diameters. And it is an object of this invention to provide a heater plate which is relatively inexpensive.

SUMMARY OF THE INVENTION

In accordance with the invention, a heater plate for butt fusion of polyolefin pipe is provided. An inner ring has an array of radial bores, each containing a cartridge heater. An outer ring concentric with the inner ring also has an array of radial bores, each containing a cartridge heater. A concentric cavity between the inner and outer rings receives wiring from the inner and outer ring cartridge heaters.

The inner ring radial bores are equally spaced. The inner ring cartridge heaters are of equal length. Each of the inner ring cartridge heaters has radially outwardly increasingly tapered wattage. The inner ring cartridge heaters extend from inner to outer concentric radii. The symmetry of the inner ring components provides a foundation for uniform surface temperature distribution across the entire area of the inner ring.

The outer ring radial bores need not be equally spaced. The outer ring heater cartridges need not be of equal length or have radially outwardly increasingly tapered wattage. The characteristics and orientation of the outer ring array of heaters are coordinated to counterbalance the heat sinks resulting from the asymmetrical configuration of the outer ring components. This counterbalancing increases the likelihood that the uniform surface temperature distribution foundation established for the entire area of the inner ring can be maintained. Furthermore, since the outer ring can be heated accurately to match the inner ring temperature distribution, the outer ring diameter can be used to butt against pipes to be fused.

The concentric rings are sandwiched between a pair of butt plates, each having an outer surface of material suitable for contact with a pipe during the heating of pipes to pipe fusion temperatures. The butt plates also cover the concentric cavity to protect the wiring contained in the cavity. The butt plates are made of material suitable for providing a thermal connecting bridge between the inner and outer rings. Preferably, the butt plates are aluminum and the outer surface of each butt plate is a (polytetrafluorethylene) TEFLON® coating.

At least one bore extends from the concentric cavity to an outer circumference of the outer ring for carrying wiring between the concentric cavity and the outer circumference of the outer ring. Preferably, at least two bores extend in parallel from the concentric cavity to the outer circumference of the outer ring. A chordal cavity in the outer ring holds a thermometer. A radial cavity in the inner ring holds an RTD (resistance temperature detector)/thermocouple. The radial cavity opens into the concentric cavity to permit wiring of the RTD (resistance temperature detector)/thermocouple to extend into the concentric cavity.

BRIEF DESCRIPTION OF THE DRAWINGS

Other objects and advantages of the invention will become apparent upon reading the following detailed description and upon reference to the drawings in which.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION OF THE INVENTION

Figure 7:
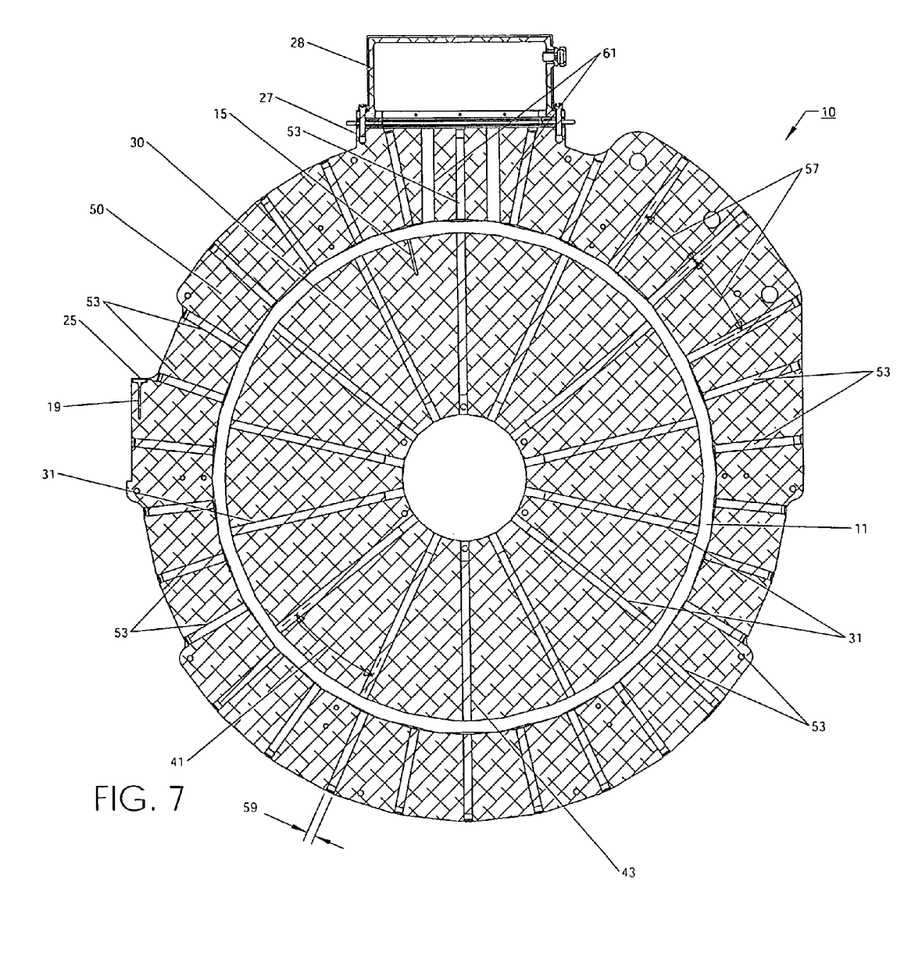
FIG. 7 is a cross-sectional view taken along the line 7-7 of FIG. 6.
Figure 8:
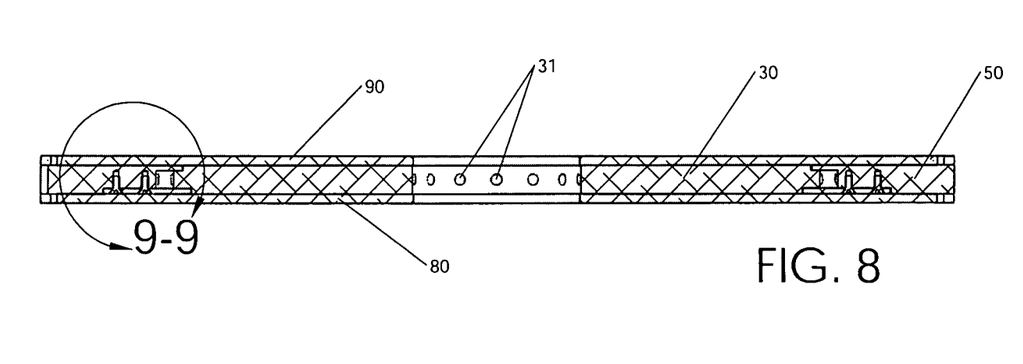
FIG. 8 is a cross-sectional view taken along the line 8-8 of FIG. 5.
Figure 9:
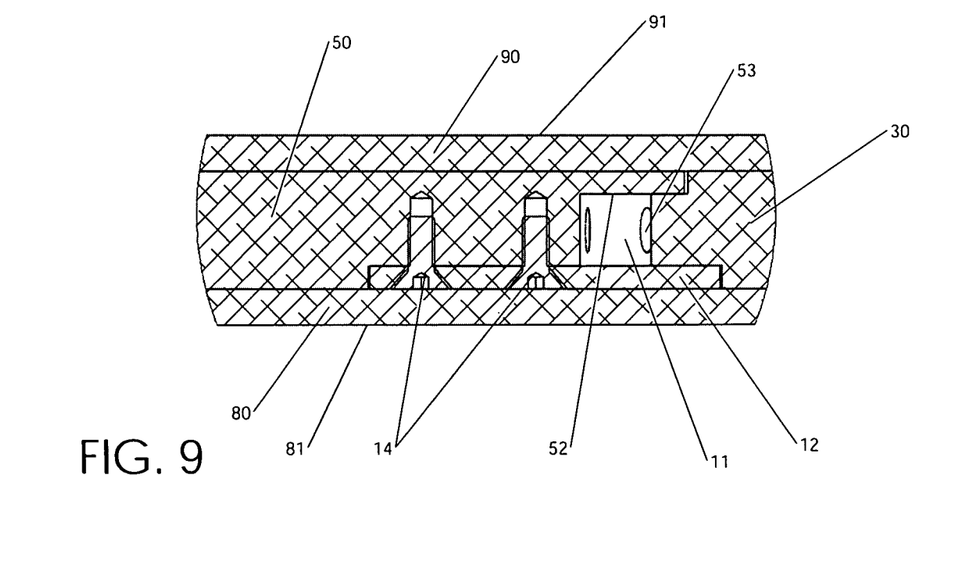
FIG. 9 is an exploded view of the area 9-9 of FIG. 8.

Turning to FIGS. 1-9, a heater plate 10 for use in end-to-end fusion of polyolefin pipe (not shown) has a heater body consisting of two concentric rings 30 and 50 with a concentric cavity 11, best seen in FIG. 7, between the rings 30 and 50. As best seen in FIGS. 8 and 9, the concentric rings 30 and 50 and the intermediate cavity 11 are sandwiched between and secured in place by a pair of butt plates 80 and 90. The outer or exposed surface 81 or 91 of each butt plate 80 or 90 is of material suitable for contact with the ends of polyolefin pipes during heating of the pipe ends to fusion temperatures. The butt plates 80 and 90 also serve as a thermal connecting bridge between the concentric rings 30 and 50 and as a protective cover for wiring which will be disposed in the between-ring concentric cavity 11. An aluminum disc with a (polytetrafluorethylene) TEFLON® coating on its outer or exposed surface has been found to provide a satisfactory butt plate 80 or 90.

The inner ring 30 has a first array of radial bores 31. Each inner ring radial bore 31 contains a metal-cased cartridge style heater 33. Each of the inner ring heaters 33 has the same tapered wattage and equal length 35. The tapered wattage increases radially outwardly along the length 35 of each heater 33. The inner and outer ends 37 and 39 of the heaters 33 are oriented in substantially concentric circles in the ring 30. The bores 31 for the inner ring heaters 33 are displaced at equal angular intervals 41 in the inner ring 30. By way of example, a suitable aluminum inner ring 30 would have a 9.5" inner diameter, a 36.5" outer diameter, taken to the inside circumference of the cavity 11, and a 1.625" thickness. A suitable heater pattern in such a ring 30 might include fourteen ⅝" diameter×12" long×62-30.5 watt per square inch heaters 33, considering the wattage to be tapered from the outer 39 to the inner 37 ends of the heater 33. Such a heater pattern has been found to perform satisfactorily in the above-described inner ring 30. The heater pattern of the inner ring 30 may be mathematically or empirically determined and more than one pattern may be suitable for the same inner ring. The symmetry of the inner ring 30 and of the inner ring heater lengths 35, wattages, wattage gradients and angular displacements 41 provides a foundation for uniform surface temperature distribution across the entire area of the inner ring 30. Variability of the duty cycle of the inner ring heaters 33 allows selection of the inner ring fusion temperature.

The outer ring 50 is concentric about the inner ring 30 and the between-rings cavity 11. However, the outer periphery 51 of the outer ring 50 need not necessarily be concentric. As shown, the outer ring 50 has an irregular outer periphery 51, including a thermometer flange 21, a mounting flange 26 and a terminal flange 27. The outer ring 50 has a second array of radial bores 53. Each outer ring radial bore 53 contains a metal-cased cartridge style heater 63, 65, 67, 69, 71, 73, 75, 77 or 79. The outer ring heaters are not necessarily the same length 55, need not have a tapered wattage or the same wattage, and need not be displaced at equal angular intervals in the outer ring 50. For example, the outer periphery 51 contour of the outer ring 50 can be shaped to accommodate any types and locations of operational, monitoring and control components chosen for the heater plate 10. As shown, the outer ring heaters have different lengths 55, watt densities and angular spacings 57. The inner perimeter of the outer ring 50 is concentric with the outer perimeter of the inner ring 30 and the lengths 55, wattages and spacings 57 of the heaters in the outer ring 50 are coordinated to counterbalance the heat sinks resulting from the selected outer shape and contents of the outer ring 50. This counterbalancing increases the likelihood that the uniform surface temperature distribution foundation established for the entire area of the inner ring 30 can be maintained. For example, with the above-described aluminum inner ring 30, a suitable aluminum outer ring 50 would have a 38.5" inner diameter, a 51.62" outer diameter not including the flanges 21, 26 and 27, and a 1.625" thickness. This combination would result in a 2" wide wiring cavity 11. Such an outer ring 50 with four 5"×525 watt heaters 63, one 5"×550 watt heater 65, one 5"×575 watt heater 67, two five"× 600 watt heaters 69, twelve 6"×600 watt heaters 71, two 6"×625 watt heaters 73, two 6"×650 watt heaters 75, three 7"×625 watt heaters 77 and three 9"×950 watt heaters 79, all ⅝" in diameter, arranged in a pattern chosen to counterbalance the temperature distribution of the outer ring 50, has been found to perform satisfactorily with the above-described inner ring 30. The heater pattern of the outer ring 50 may be mathematically or empirically determined and more than one pattern may be suitable for the same outer ring. Variability of the duty cycle of the outer ring heaters 63, 65, 67, 69, 71, 73, 75, 77 and 79 allows selection of the outer ring fusion temperature.

The inner and outer ring radial bore diameters 43 and 59, respectively, are such that their respective heaters can snugly but easily slide into their bores 31 and 53. For example, for ⅝" or 0.625" diameter heaters, bores of a 0.63" diameter would be suitable. The inner ring heaters 33 are inserted into the outer ends of their respective bores 31 so that their wiring extends out of their bores 31 and into the cavity 11. The outer ring heaters 63, 65, 67, 69, 71, 73, 75, 77 and 79 are inserted into the inner ends of their respective bores 53 so that their wiring extends out of their bores 53 and into the cavity 11. The close fit of the heaters 33 and 63, 65, 67, 69, 71, 73, 75, 77 and 79 in their bores 31 and 53, combined with the rigidity of the heater wiring and the snug fit of the wiring in the concentric cavity 11 is sufficient to hold the heaters in place in the bores 31 and 53. Expansion plugs 13 are countersunk into the outer ends of the outer ring radial bores 63, 65, 67, 69, 71, 73, 75, 77 and 79 to keep water and debris out of the heater plate 10.

An additional cavity 15 is machined in the heater body to contain an RTD (resistance temperature detector)/thermocouple 17. As shown in FIG. 7, the thermocouple cavity 15 is a bore extending radially from the concentric cavity 11 into an outer portion of the inner ring 30 midway between two adjacent inner ring heater bores 31. The RTD (resistance temperature detector)/thermocouple 17 is inserted into the thermocouple cavity 15 with its wiring extending into the concentric cavity 11. A chordally-oriented cavity 19 is also machined in the flange 21 on the outer perimeter 51 of the outer ring 50 to hold a thermometer 22. The neck 23 of the thermometer 22 is inserted into the thermometer cavity 19 and the dial 24 is seated in a countersink 25 in the flange 21.

One or more passageways 61 are also machined into the outer ring 50 for extending wiring between the concentric cavity 11 and the outer perimeter 51 of the outer ring 50. As shown, the passageways 61 are a pair of bores parallel to and symmetrically spaced from one of the outer ring heater bores 53. The passageways 61 extend from the concentric cavity 11 to the outer perimeter 51 of the heater body outer ring 50 and, as shown, do not intersect any of the outer ring heater bores 53. The butt plates cover and protect the wiring disposed in the concentric cavity 11.

As best seen in FIGS. 3-9, the outer ring 50 has a first concentric deep seat 52 machined in its inner circumference and a second wider concentric shallow seat 54 machined in its inner circumference. The outer ring radial bores 53 and wiring passageways 61 extend into the deep seat 54. The shallow concentric seat 54 also has radially extended portions 56. As best seen in FIG. 9, the inner ring 30 has a concentric seat 36 in its outer circumference to receive a circumferential flange 58 formed along the outer ring 50 by the machining of the deep seat 52. The outer ring flange 58 is longer than the inner ring seat 36, resulting in the concentric cavity 11 between the rings 30 and 50. Looking at FIGS. 3 and 9, the inner ring radial bores 31 extend between the flange 58 and the plate 12 into the cavity 11.

Figure 1:
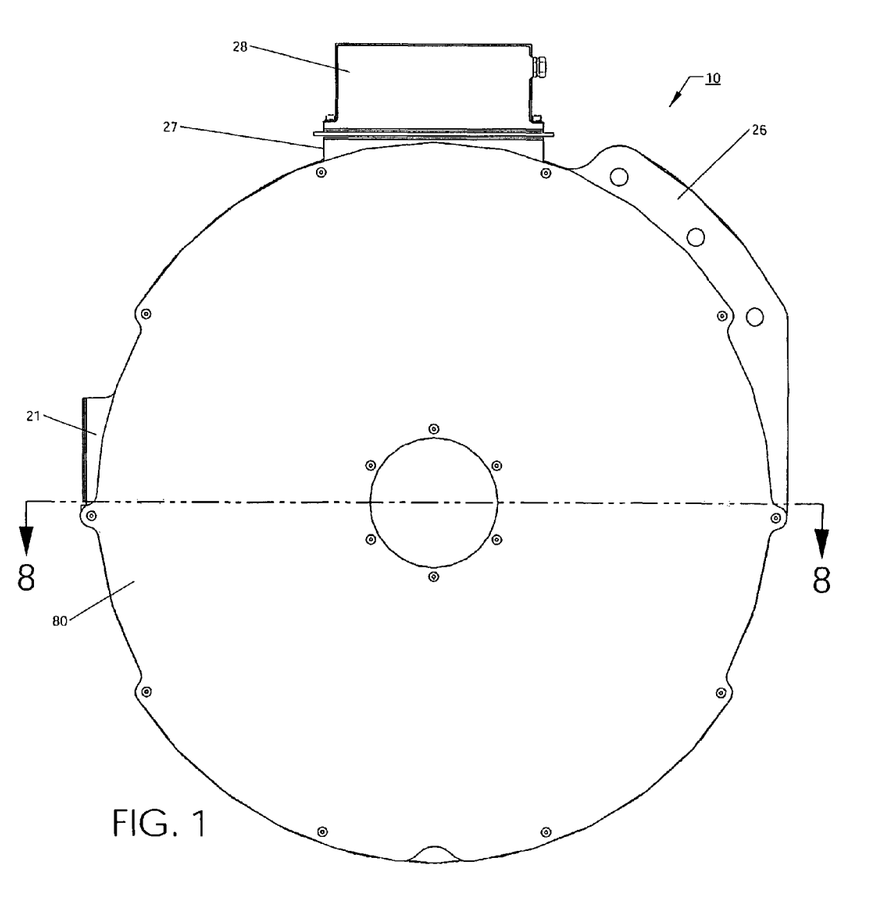
FIG. 1 is a front elevation view of a heater plate in accordance with the invention.
Figure 2:
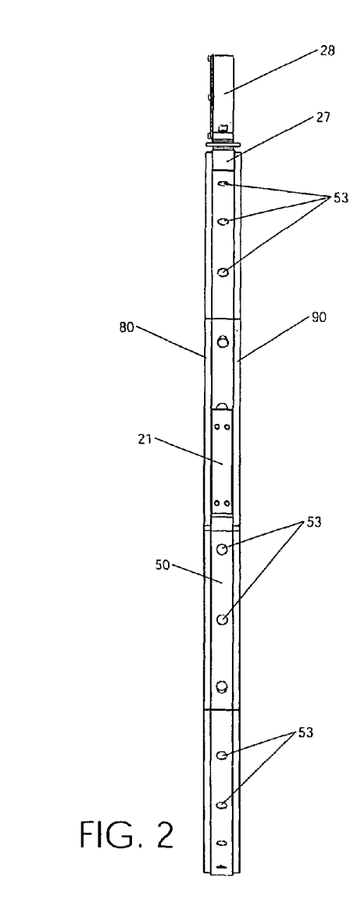
FIG. 2 is a side elevation view of the heater plate of FIG. 1.
Figure 3:
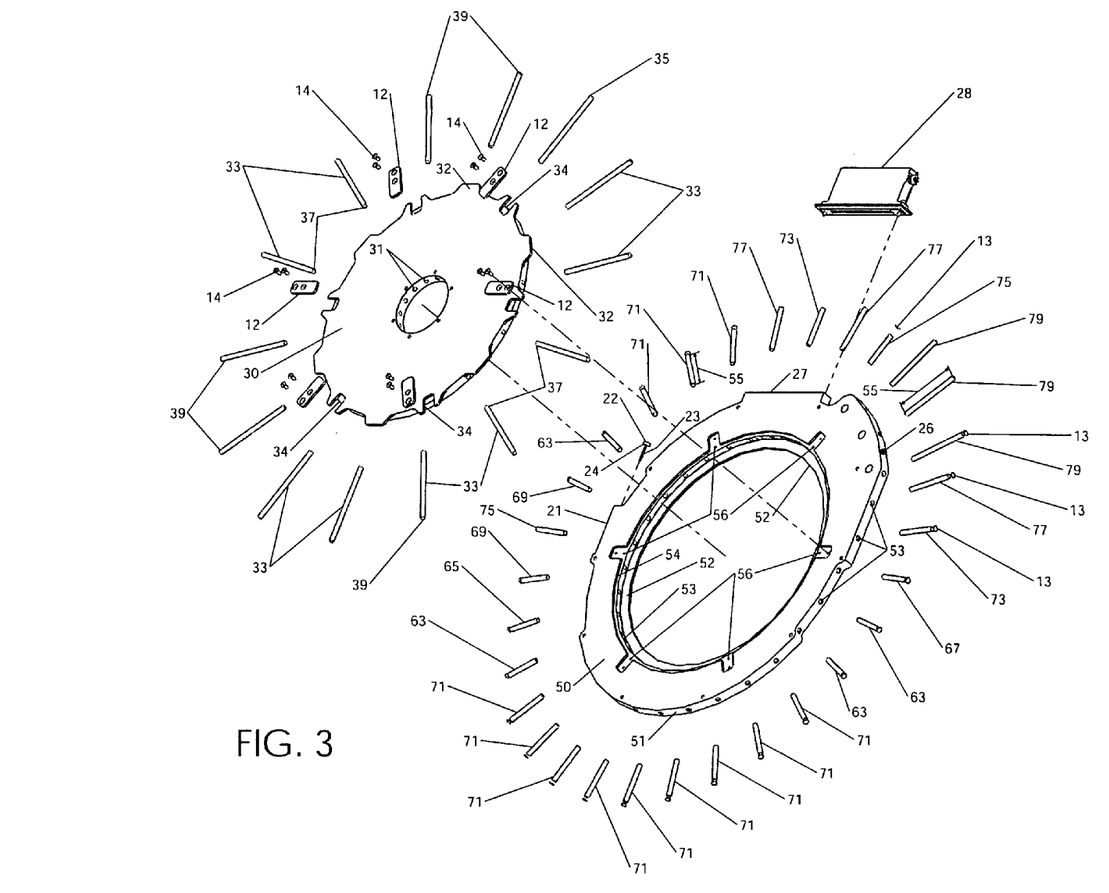
FIG. 3 is a perspective assembly view of the heater plate of FIG. 1.
Figure 4:
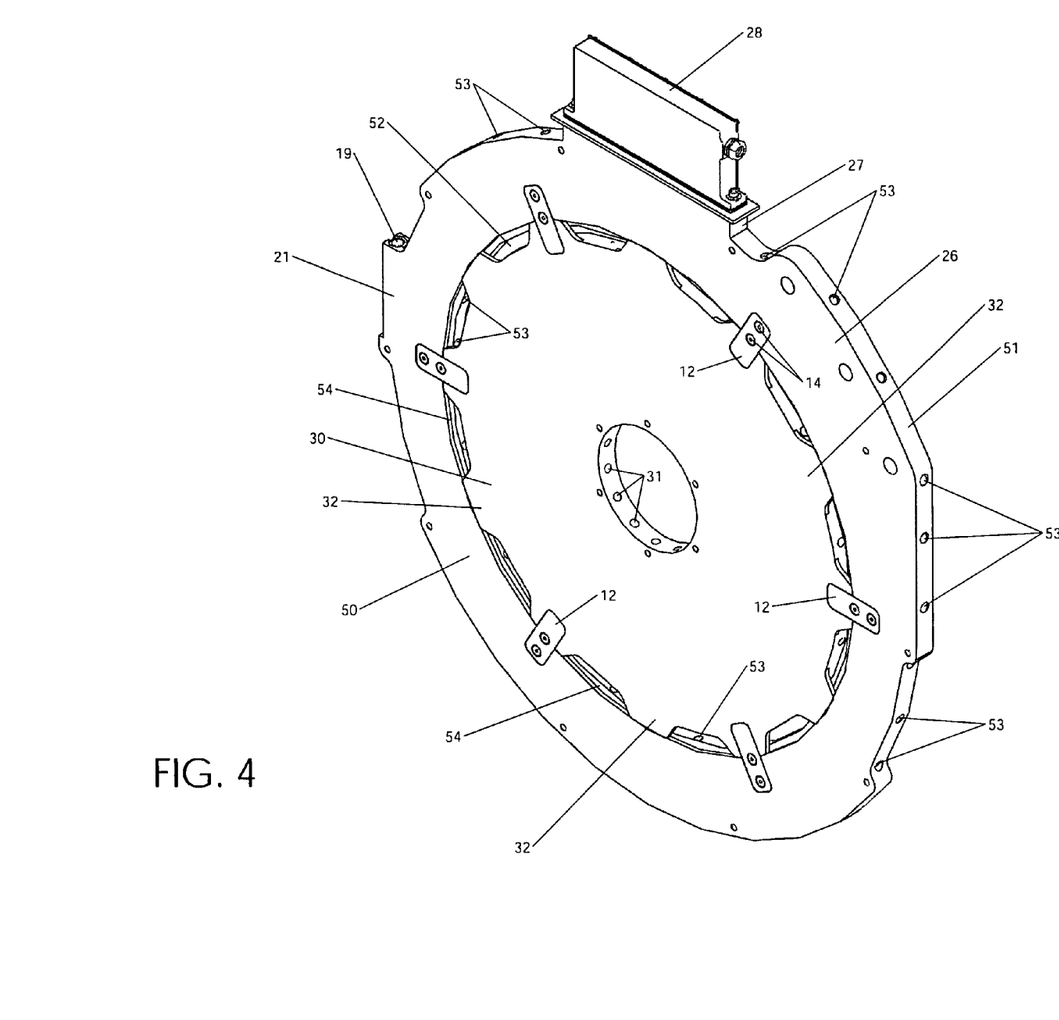
FIG. 4 is a perspective view of the concentric rings of the heater plate of FIG. 1.
Figures 5, 6:
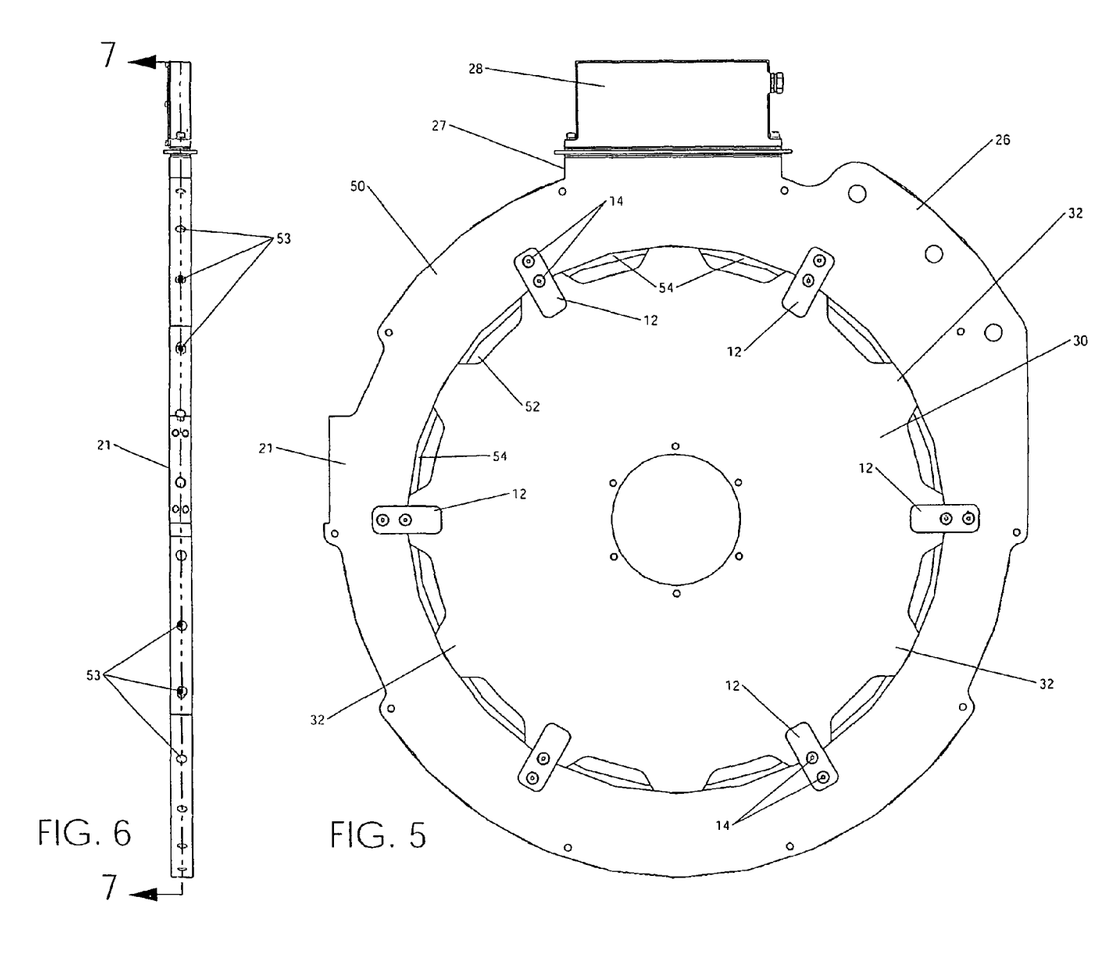
FIG. 5 is a front elevation view of the concentric rings of the heater plate of FIG. 1.
FIG. 6 is a side elevation view of the concentric rings of the heater plate of FIG. 1.

Looking at FIGS. 3-5, the inner ring 30 is also machined to provide radial arms 32 which rest in the outer ring shallow seat 54. The thickness and diameter of the arms 32 are such as to position the rings 30 and 50 in concentric and flush orientation. As seen in FIGS. 3 and 9, some of the inner ring extending arms 32 have notches 34 which will align with the outer ring radial shallow seat extensions 56. Plates 12 seated in the aligned notches 34 and seat extensions 56 are secured to the outer ring 50 by screws 14, clamping the inner ring 30 against the outer ring circumferential flange 58 formed by the machining of the outer ring deep seat 52. The opposite outer faces of the inner and outer rings 30 and 50 are flush to receive the butt plates 80 and 90.

Figure 10:
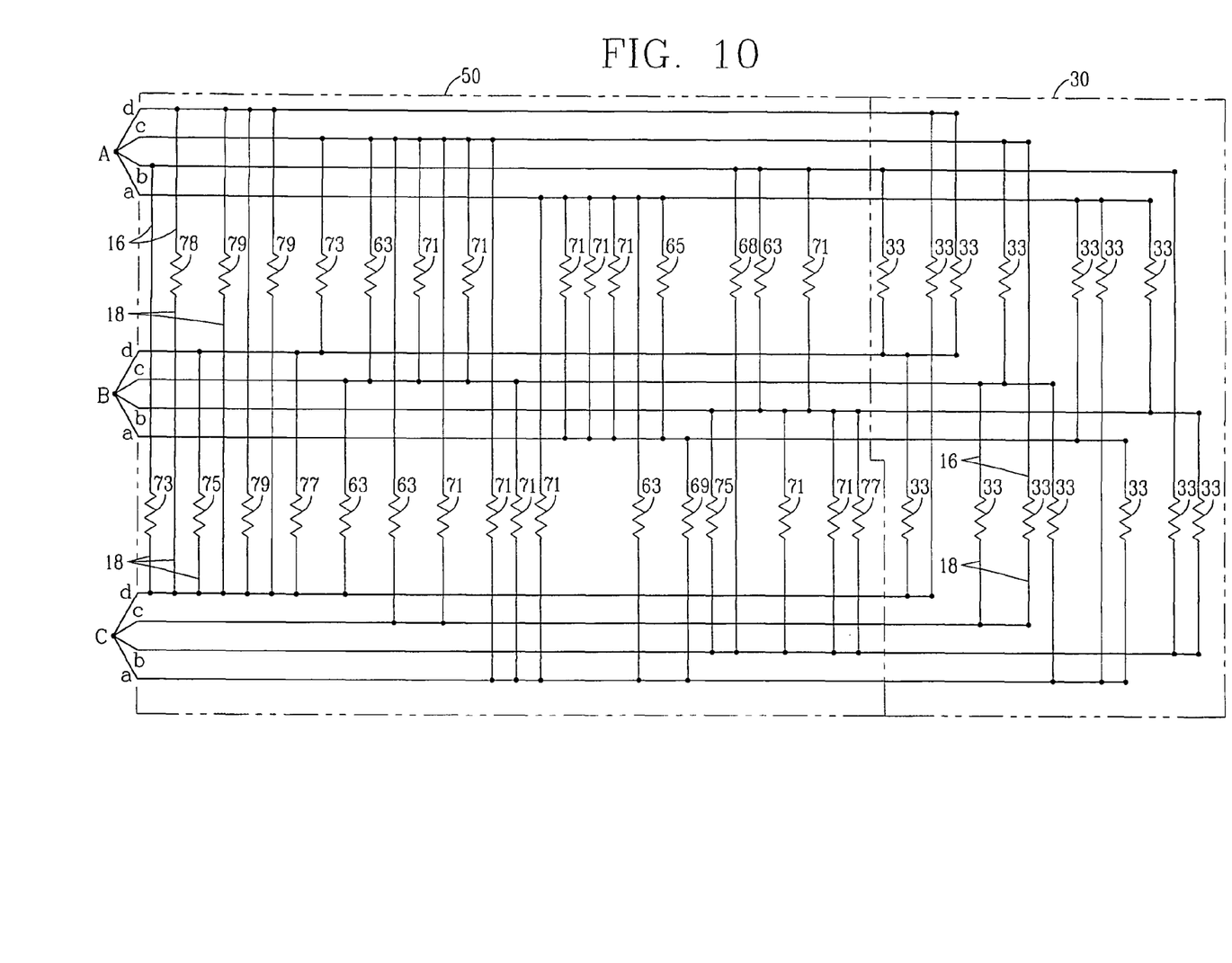
FIG. 10 is a schematic wiring diagram of the electrical system of the heater plate of FIG. 1.

Looking at FIGS. 3 and 10, the heater plate 10 is wired for three-phase operation with the inner ring heaters 33 and the outer ring heaters 63, 65, 67, 69, 71, 73, 75, 77 and 79 divided electrically among phases A-B, B-C and C-A so as to distribute the wattage of the heaters substantially evenly. Each phase is communicated from the terminal block 28 by one or more wires, as shown $A_a$, $A_b$, $A_c$ and $A_d$, $B_a$, $B_b$, $B_c$ and $B_d$ and $C_a$, $C_b$, $C_c$ and $C_d$ through the wiring passages 61 to the wiring cavity 11. Wires 16 and 18 from each heater exit their respective bores 31 and 53 into the wiring cavity 11 for connection to the phase wires. The physical orientation of the wiring in the heater plate 10 is arranged to structurally accommodate the wires in the available cavity and passageway space.

Thus, it is apparent that there has been provided, in accordance with the invention, a heater plate for use in end-to-end fusion of polyolefin pipe that fully satisfies the objects, aims and advantages set forth above. While the invention has been described in conjunction with a specific embodiment thereof, it is evident that many alternatives, modifications and variations will be apparent to those of ordinary skill in the art and in light of the forgoing description. Accordingly, it is intended to embrace all such alternatives, modifications and variations as fall within the spirit of the appended claims.

What is claimed is:

1. For use in butt fusion of polyolefin pipes, a heater plate comprising:
    an inner ring having an array of inner ring radial bores, each said inner ring bore containing an inner ring cartridge heater;
    an outer ring concentric with said inner ring and having an array of outer ring radial bores, each said outer ring bore containing an outer ring cartridge heater; and
    a cavity between and concentric with said inner and outer rings for receiving wiring from said inner and outer ring cartridge heaters.

2. A heater plate according to claim 1, said inner ring radial bores being equally spaced.

3. A heater plate according to claim 1, said inner ring cartridge heaters being of equal length.

4. A heater plate according to claim 1, each of said inner ring cartridge heaters having radially outwardly increasingly tapered wattage.

5. A heater plate according to claim 1, said inner ring radial bores being equally spaced and said inner ring cartridge heaters extending from inner to outer concentric radii and having radially outwardly increasingly tapered wattage.

6. A heater plate according to claim 1, said concentric rings being sandwiched between a pair of butt plates, each said plate having an outer surface of material suitable for contact with a pipe during heating thereof to pipe fusion temperatures.

7. A heater plate according to claim 6, said butt plates covering said wiring cavity to protect wiring contained therein.

8. A heater plate according to claim 6, said butt plates being of material suitable for providing a thermal connecting bridge between said inner and outer rings.

9. A heater plate according to claim 6, said outer surface of each said butt plate being a Teflon® coating.

10. A heater plate according to claim 1 further comprising at least one bore extending from said cavity to an outer circumference of said outer ring for carrying wiring between said cavity and said outer circumference.

11. A heater plate according to claim 1 further comprising at least two bores extending in parallel from said cavity to an outer circumference of said outer ring for carrying wiring between said cavity and said outer circumference.

12. A heater plate according to claim 1 further comprising a chordal cavity in said outer ring for holding a thermometer.

13. A heater plate according to claim 1 further comprising at least one passageway extending from said cavity to an outer circumference of said outer ring for carrying wiring between said cavity and said outer circumference.

14. A heater plate according to claim 1 further comprising a radial cavity in said inner ring for holding an RTD/thermocouple.

15. A heater plate according to claim 14, said radial cavity opening into said concentric cavity to permit wiring of said RTD/thermocouple to extend into said concentric cavity.

\* \* \* \* \*